US009338153B2

(12) United States Patent
McFarland et al.

(10) Patent No.: US 9,338,153 B2
(45) Date of Patent: May 10, 2016

(54) SECURE DISTRIBUTION OF NON-PRIVILEGED AUTHENTICATION CREDENTIALS

(71) Applicant: TeleCommunication Systems, Inc., Annapolis, MD (US)

(72) Inventors: Keith A. McFarland, Annapolis, MD (US); Kambiz Ghozati, Ellicott City, MD (US); John Stevens, Middle River, MD (US); Wiliam P. Wells, Federal Way, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 54 days.

(21) Appl. No.: 13/860,094

(22) Filed: Apr. 10, 2013

(65) Prior Publication Data

US 2013/0291078 A1 Oct. 31, 2013

Related U.S. Application Data

(60) Provisional application No. 61/622,829, filed on Apr. 11, 2012.

(51) Int. Cl.
*H04L 29/06* (2006.01)

(52) U.S. Cl.
CPC ............... *H04L 63/08* (2013.01); *H04L 63/18* (2013.01)

(58) Field of Classification Search
CPC ......... H04L 63/08; H04L 67/26; H04L 63/18; H04L 29/06755; H04L 65/00
See application file for complete search history.

(56) References Cited

U.S. PATENT DOCUMENTS 1,103,073 A 7/1914 O'Connell
4,445,118 A 4/1984 Taylor et al.
(Continued)

FOREIGN PATENT DOCUMENTS

EP 1387239 2/2004
SE PCT/SE98/01887 10/1998
(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
(Continued)

*Primary Examiner* — Hadi Armouche
*Assistant Examiner* — Cheng-Feng Huang
(74) *Attorney, Agent, or Firm* — William H. Bollman (57) ABSTRACT

An authentication credentials push service (ACPS) that securely pushes non-privileged authentication credentials to registered client entities. The ACPS comprises a classification server and a push server to provide access to non-privileged authentication credentials absent a pull transaction. The classification server in the ACPS classifies authentication credentials as either privileged (i.e. private, forgeable) or non-privileged (i.e. non-forgeable, non-sensitive). Credentials identified as being of a privileged nature are treated with restricted access. Alternatively, credentials classified as being of a non-privileged nature are made available for the push service. Authentication servers register with the ACPS to become consumers of the push service. A push server within the ACPS pushes non-privileged authentication credentials to registered authentication servers at predetermined intervals. Individual authentication credentials push services (ACPS) have access to different authentication credentials. An authentication server can use a dynamic name service (DNS) lookup to find a specific authentication credentials push service (ACPS).

6 Claims, 6 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Scheffer |
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,930,701 A | 7/1999 | Skog |
| 5,943,399 A | 8/1999 | Banister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |

(56) References Cited

U.S. PATENT DOCUMENTS

| | | |
|---|---|---|
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,028 A | 10/2000 | Whitington |
| 6,131,067 A | 10/2000 | Girerd |
| 6,133,874 A | 10/2000 | Krasner |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotala |
| 6,324,524 B1 | 11/2001 | Lent |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |

(56) References Cited

U.S. PATENT DOCUMENTS

| | | |
|---|---|---|
| 6,671,620 B1 | 12/2003 | Garin |
| 6,677,894 B2 | 1/2004 | Sheynblat |
| 6,680,694 B1 | 1/2004 | Knockeart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,757,828 B1 | 6/2004 | Jaffe |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B2 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B1 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,260,186 B2 | 8/2007 | Zhu |
| 7,260,384 B2 | 8/2007 | Bales et al. |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |

(56) References Cited

U.S. PATENT DOCUMENTS

| | | |
|---|---|---|
| 7,382,773 B2 | 6/2008 | Schoeneberger |
| 7,394,896 B2 | 7/2008 | Norton |
| 7,428,571 B2 | 9/2008 | Ichimura |
| 7,436,785 B1 | 10/2008 | McMullen |
| 7,440,442 B2 | 10/2008 | Grabelsky et al. |
| 7,573,982 B2 | 8/2009 | Breen |
| 7,602,886 B1 | 10/2009 | Beech |
| 7,711,094 B1 | 5/2010 | Olshansky |
| 7,783,297 B2 | 8/2010 | Ishii |
| 2001/0011247 A1 | 8/2001 | O'Flaherty |
| 2001/0014085 A1* | 8/2001 | Johansson et al. ............ 370/329 |
| 2001/0040886 A1 | 11/2001 | Jimenez |
| 2001/0049274 A1 | 12/2001 | Degraeve |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0156732 A1 | 10/2002 | Odijk |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0096626 A1 | 5/2003 | Sabo et al. |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0196105 A1 | 10/2003 | Fineberg |
| 2003/0204640 A1 | 10/2003 | Sahinoja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068665 A1* | 4/2004 | Fox et al. ...................... 713/201 |
| 2004/0068724 A1 | 4/2004 | Gardner |
| 2004/0092250 A1 | 5/2004 | Valloppillil |
| 2004/0098497 A1 | 5/2004 | Banet |
| 2004/0132465 A1 | 7/2004 | Mattila |
| 2004/0148357 A1 | 7/2004 | Corrigan et al. |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203922 A1 | 10/2004 | Hines |
| 2004/0205151 A1 | 10/2004 | Sprigg |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0071671 A1 | 3/2005 | Karaoguz |
| 2005/0083911 A1 | 4/2005 | Grabelsky |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0119012 A1 | 6/2005 | Merheb |
| 2005/0132200 A1 | 6/2005 | Jaffe |
| 2005/0134504 A1 | 6/2005 | Harwood |
| 2005/0135569 A1 | 6/2005 | Dickinson et al. |
| 2005/0136885 A1 | 6/2005 | Kaltsukis |
| 2005/0149430 A1 | 7/2005 | Williams |
| 2005/0149626 A1* | 7/2005 | Manchester et al. .......... 709/220 |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0243778 A1 | 11/2005 | Wang |
| 2005/0250516 A1 | 11/2005 | Shim |
| 2005/0259675 A1 | 11/2005 | Tuohino |
| 2005/0265318 A1 | 12/2005 | Khartabil |
| 2005/0266864 A1 | 12/2005 | Chen et al. |
| 2005/0271029 A1 | 12/2005 | Iffland |
| 2005/0282518 A1 | 12/2005 | D'Evelyn |
| 2005/0287979 A1 | 12/2005 | Rollender |
| 2005/0287990 A1 | 12/2005 | Mononen |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058102 A1 | 3/2006 | Nguyen et al. |
| 2006/0064307 A1 | 3/2006 | Pakkala |
| 2006/0068753 A1 | 3/2006 | Karpen |
| 2006/0079249 A1 | 4/2006 | Shim |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0242230 A1 | 10/2006 | Smith |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |

(56) References Cited

U.S. PATENT DOCUMENTS

| | | |
|---|---|---|
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0049288 A1 | 3/2007 | Lamprecht |
| 2007/0072624 A1 | 3/2007 | Niemaenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0202897 A1 | 8/2007 | Smith |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0244987 A1* | 10/2007 | Pedersen et al. ............... 709/217 |
| 2007/0263610 A1 | 11/2007 | Mitchell |
| 2007/0270164 A1 | 11/2007 | Maier |
| 2008/0014931 A1 | 1/2008 | Yared |
| 2008/0020733 A1 | 1/2008 | Wassingbo |
| 2008/0037715 A1 | 2/2008 | Prozeniuk |
| 2008/0063153 A1 | 3/2008 | Krivorot |
| 2008/0065775 A1 | 3/2008 | Polk |
| 2008/0109650 A1 | 5/2008 | Shim |
| 2008/0117859 A1 | 5/2008 | Shahidi |
| 2008/0173709 A1* | 7/2008 | Ghosh ........................... 235/382 |
| 2008/0186164 A1 | 8/2008 | Emigh |
| 2008/0214202 A1 | 9/2008 | Toomey |
| 2008/0263169 A1 | 10/2008 | Brabec et al. |
| 2009/0137244 A1 | 5/2009 | Zhou et al. |
| 2009/0158136 A1 | 6/2009 | Rossano et al. |
| 2009/0158397 A1 | 6/2009 | Herzog et al. |
| 2009/0172804 A1 | 7/2009 | Spies et al. |
| 2009/0205027 A1* | 8/2009 | Salazar et al. .................... 726/6 |
| 2009/0265552 A1 | 10/2009 | Moshir et al. |
| 2009/0265763 A1 | 10/2009 | Davies et al. |
| 2009/0320123 A1 | 12/2009 | Yu |
| 2010/0094996 A1* | 4/2010 | Samaha ........................ 709/224 |
| 2010/0100928 A1* | 4/2010 | Gasparini et al. .................. 726/1 |
| 2010/0162371 A1* | 6/2010 | Geil ................................. 726/5 |
| 2010/0205242 A1* | 8/2010 | Marchioro, II ........ G06Q 10/10 709/203 |
| 2010/0311447 A1 | 12/2010 | Jackson |
| 2011/0053618 A1 | 3/2011 | Lin et al. |
| 2011/0145564 A1 | 6/2011 | Moshir et al. |
| 2011/0159862 A1* | 6/2011 | Jackson ................ G01S 5/0289 455/418 |
| 2011/0252146 A1 | 10/2011 | Santamaria et al. |
| 2011/0300830 A1 | 12/2011 | Ramrattan |
| 2011/0307947 A1 | 12/2011 | Kariv |
| 2012/0150968 A1 | 6/2012 | Yasrebi et al. |
| 2012/0192287 A1 | 7/2012 | Cai et al. |
| 2013/0111550 A1* | 5/2013 | Naveh ..................... G06F 9/468 726/3 |
| 2013/0171971 A1 | 7/2013 | Fujii |
| 2013/0191908 A1 | 7/2013 | Klein |
| 2013/0202108 A1 | 8/2013 | Kao |

FOREIGN PATENT DOCUMENTS

| | | |
|---|---|---|
| WO | PCTUS9928848 | 12/1999 |
| WO | WO01/45342 | 6/2001 |
| WO | PCTUS0146666 | 11/2001 |
| WO | WO2004/025941 | 3/2004 |
| WO | PCT/US2005/022090 | 6/2005 |
| WO | WO2005/051033 | 6/2005 |
| WO | WO/2006/075856 | 7/2006 |

OTHER PUBLICATIONS

International Search Report in PCT/US2007/23243 dated Apr. 2, 2008.
PCT International Search Report (PCTUS2007/23714) and Written Opinion of International Searching Authority, Apr. 18, 2008.
Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.
Location Based Services V2 Roaming Support (non proprietary), 80-V8470-2NP A, dated Jan. 27, 2005, pp. 1-56.
Qualcomm CDMA Technologies, MS Resident User Plane LBS Roaming—80-VC718-1 E, 2006, pp. 1-37.
Qualcomm CDMA Technologies, LBS Control Plane/User Plane Overview—80-VD378-1 NP B, 2006, pp. 1-36.
Bhalla et al, TELUS, Technology Strategy—LBS Roaming Summit, Sep. 19, 2006.
Alfredo Aguirre, Iusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Qualcomm CDMA Technologies, LBS Control Plane Roaming—80-VD377-1 NP A, 2006, pp. 1-10.
International Search Report received in PCT/US2013/21199 dated Mar. 26, 2013.
International Search Report received in PCT/US2012/068083 dated Feb. 8, 2013.

* cited by examiner

SECURE DISTRIBUTION OF NON-PRIVILEGED AUTHENTICATION CREDENTIALS

The present invention claims priority from U.S. Provisional No. 61/622,829, filed Apr. 11, 2012, entitled "Secure Distribution of Non-Privileged Authentication Credentials", the entirety of which is expressly incorporated herein by reference.

BACKGROUND OF THE INVENTION

1. Field of the Invention

This invention relates generally to user authentication, secure user plan location (SUPL), authentication credentials, and public key infrastructure (PKI).

2. Background of Related Art

Authentication transactions are used to securely identify users, processes, and/or devices attempting to access a particular restricted service. Existing authentication transactions are implemented via a pull technology, i.e., a style of network communication in which clients request and pull information from centralized servers. Pull based authentication transactions may be executed via numerous pull based technologies, e.g., Home Location Registers (HLRs), Home Subscriber Servers (HSS), Triple A (AAA), Public Key Infrastructure (PKI) (a pull based technology that exposes the use of an online certificate status protocol (OCSP)), etc. Each existing pull based technology encompasses a well defined interface, designed to enable clients to query their service.

Figure 5:
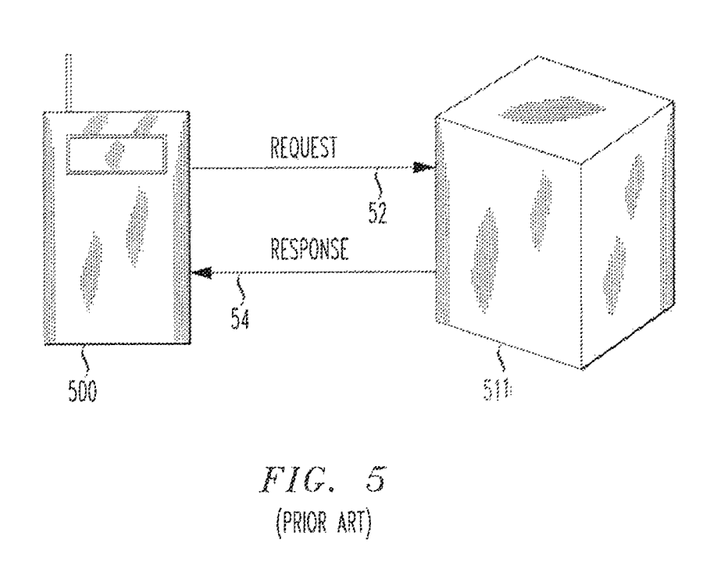
FIG. 5 depicts exemplary behavior of a conventional pull based technology.

FIG. 5 depicts exemplary behavior of a conventional pull based technology.

In particular, a client entity (e.g. a client device, user, process, etc.) 500 in a pull based technology sends an initial request for data to a receiving authenticator server 511, as depicted in step 52 of FIG. 5. The receiving authenticator server 511 then processes the client request and returns a relevant response, as depicted in step 54 of FIG. 5.

In a conventional pull based authentication transaction, a client entity (e.g. a client device, user, process, etc.) initiates a request (a pull transaction) for information and/or verification of authentication credentials to an authentication server, to which the authentication server subsequently responds.

Figure 6:
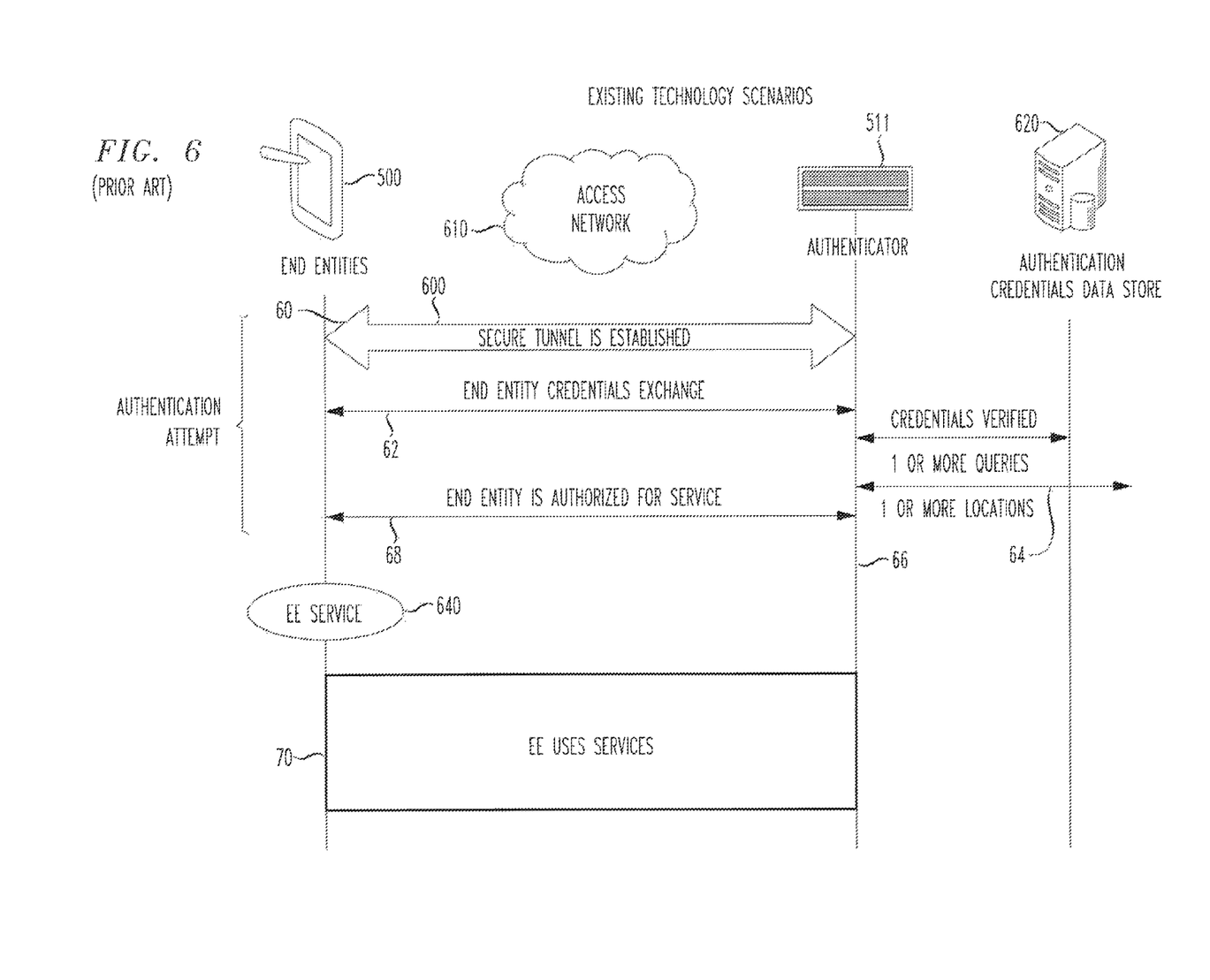
FIG. 6 depicts logic flow for existing pull based authentication transactions.

FIG. 6 depicts logic flow for existing pull based authentication transactions.

In particular, to implement a pull based authentication transaction, a secure tunnel 600 is first established between a client entity 500 and an authenticator server 511, over an access network 610, as depicted in step 60 of FIG. 6. As depicted in step 62, the client entity 500 at one end of the secure tunnel 600 sends authentication credentials and/or a restricted service 640 authorization request to the authenticator server 511 at the other end of the secure tunnel 600. Upon receiving the client request, the authenticator server 511 initiates one or more queries (pull transactions) to one or more authentication data stores 620, requesting public and/or private authentication credentials for the requesting client entity 500, as depicted in step 64. In step 66, the authenticator server 511 uses authentication credentials retrieved from the authentication credentials data store(s) 620 to verify authentication credentials received (in step 60) from the client entity 500. In step 68, the authenticator server 511 authenticates the client entity 500 and authorizes the client entity 500 to access the restricted service (i.e. a service contingent upon authentication) 640. In step 70, the client entity 500 proceeds to access the restricted service 640.

To minimize impacts on authentication servers and client entities, pull servers are often positioned at locations near one another. Positioning pull servers at nearby locations (i.e. server co-location) helps minimize round trip delay and network latency. Unfortunately, server co-location also results in reduced resiliency through geographic distribution.

SUMMARY OF THE INVENTION

A service to securely pushed non-privileged authentication credentials to registered client entities comprises an authentication credentials push service (ACPS). In accordance with the principles of the present invention, an authentication credentials push service (ACPS) distinguishes between privileged (i.e. private, forgeable) authentication credentials and non-privileged (i.e. non-forgeable, non-sensitive) authentication credentials, to provide access to non-privileged authentication credentials absent a pull transaction. The present invention improves the performance and reduces delay of authentication transactions by permitting authentication credentials that include only non-privileged authentication information to be freely distributed for use amongst authentication servers.

In accordance with the principles of the present invention, the authentication credentials push service (ACPS) comprises a classification server to classify authentication credentials as either privileged or non-privileged. The authentication credentials push service (ACPS) restricts access (i.e. access is permitted via a pull transaction) to all authentication credentials classified as privileged, and classifies all non-privileged authentication credentials as available for the push service.

In accordance with the principles of the present invention, authentication servers register with the authentication credentials push service (ACPS) to become consumers of the push service. The authentication credentials push service (ACPS) comprises a push server to push non-privileged authentication credentials to registered authentication servers at predetermined intervals.

In accordance with the principles of the present invention, individual authentication credentials push services (ACPS) have access to different authentication credentials. An authentication server can use a dynamic name service (DNS) lookup to find a specific authentication credentials push service (ACPS) to fulfill its authentication requirements.

BRIEF DESCRIPTION OF THE DRAWINGS

Features and advantages of the present invention become apparent to those skilled in the art from the following description with reference to the drawings, in which.

DETAILED DESCRIPTION OF ILLUSTRATIVE EMBODIMENTS

The present invention comprises an authentication credentials push service (ACPS) that securely pushes non-privileged (i.e. public) authentication credentials to registered client entities (i.e. authentication servers). The inventive authentication credentials push service (ACPS) distinguishes between privileged and non-privileged authentication credentials to provide access to non-privileged authentication credentials absent a pull transaction.

Various types of authentication credentials may be used to authenticate a transaction request. For instance, authentication credentials may include public and/or private authentication information. The present inventors have realized that conventional pull based authentication transactions do not distinguish amongst authentication credentials. Rather, most conventional authentication systems treat all authentication credentials as private/privileged information that may be shared only via a pull transaction.

However, the inventors herein realized that use of a pull transaction in the middle of an authentication transaction may cause significant transaction delay and may substantially degrade the performance of an authentication server. Moreover, insertion of a pull transaction in the middle of an authentication transaction often results in decreased scalability, decreased throughput, server co-location, and a lack of distinction amongst credentials.

For instance, an authentication transaction which must rely on an external pull transaction requires more system and network resources to complete the transaction. In particular, pull based authentication transactions require additional computer resources and time to request, receive, and process information during a pull transaction.

Further, pull based authentication transactions must request authentication credentials on an individual basis when credentials for individual users/devices require authentication at different server locations. Consequently, in many instances, authentication servers are unable to group pull transactions to improve efficiency, thereby resulting in reduced scalability.

When a pull transaction is implemented during an authentication transaction, the authentication transaction must go on hold until the external pull transaction is complete. Such a hold may add significant transaction delay, and may result in additional queuing capability and client entity impacts.

Moreover, an authentication server has no control over the responsiveness of a service from which a pull transaction is requested. For instance, due to other simultaneous activities, a pull server may experience abnormal delays. Abnormal delays at a pull server may lead to further downstream impacts on an authentication server and client entities.

The present inventors have appreciated that authentication servers sometimes require additional non-privileged authentication information (in addition to privileged authentication information) to authenticate transaction requests. However, conventional authentication services typically treat all authentication credentials as privileged/private information that may be shared only via a pull based transaction.

For instance, for authentication transactions in which additional non-privileged authentication information is required, conventional authentication servers may use inline queries to request (pull) this additional information from a designated service. In particular, an authentication server may use an inline query to acquire, e.g., an exposed Certificate Revocation List (CRL) (i.e. public information) relevant to a client entity requesting authentication. The authentication server may then use this Certificate Revocation List (CRL) for authentication purposes, e.g., an authentication server may verify the status of the certificate to authenticate a client entity. An authentication server may additionally initiate pull transactions to request device and/or user characteristics from a credentials database/other designated service.

However, use of a pull transaction in the middle of an authentication transaction may cause significant transaction delay and may substantially degrade the performance of an authentication server. In particular, insertion of a pull transaction in the middle of an authentication transaction often results in decreased scalability, decreased throughput, server co-location, and a lack of distinction amongst credentials. Even so, conventional authentication transactions use pull transactions to acquire nearly all authentication credentials used to fulfill authentication requests.

In accordance with the principles of the present invention, an authentication credentials push service (ACPS) distinguishes between privileged and non-privileged authentication credentials to provide access to non-privileged authentication credentials absent a pull transaction. The authentication credentials push service (ACPS) provides a service to securely push non-privileged authentication credentials to registered clients. By enabling non-privileged authentication credentials to be accessed without a pull transaction, the present invention minimizes the number of pull transactions required during an authentication transaction and thus reduces delay and improves the performance of authentication transactions.

In accordance with the principles of the present invention, to provide non-privileged authentication credentials via a push service, the authentication credentials push service (ACPS) comprises a classification server to classify authentication credentials as either 'privileged' or 'non-privileged'. In particular, the classification server classifies credentials containing private, forgeable information, such as username/password combinations, etc., as privileged authentication credentials. Moreover, the classification server classifies authentication credentials containing only non-forgeable, non-sensitive information, such as information regarding a current state of a requesting client entity (e.g., an IP address, host name, operating system, etc.) as non-privileged authentication credentials. Non-privileged authentication credentials include credentials that may be made publicly available.

Non-privileged authentication credentials must be used in combination with privileged authentication credentials to authenticate a transaction request and are not sufficient for authentication when used alone. Nonetheless, non-privileged authentication credentials play a valid and important role in transaction authentication. For instance, non-privileged authentication credentials are often used to perform validity checks. Exemplary non-privileged authentication credentials include: certificate revocation status, public keys, certificates, location information, device information, etc.

In accordance with the principles of the present invention, the authentication credentials push service (ACPS) awards an access restriction to each authentication credential, based on a classification of its contents. In particular, a system administrator identifies which authentication credentials are classified as privileged and which are classified as non-privileged either via an authentication credentials push service (ACPS) system configuration or via user to machine interfaces (graphical user interfaces (GUI)). Credentials identified as being of a privileged nature are treated with restricted access (as is the case in the marketplace today). In accordance with conventional authentication transactions, privileged (restricted access) authentication credentials are typically accessible via pull based transactions, only. Privileged authentication credentials may also be used in out of band sequences (which the ACPS may additionally support). Alternatively, authentication credentials identified as being of a non-privileged nature are classified as being available for the push service.

In accordance with the principles of the present invention, clients (authentication servers) register with the authentication credentials push service (ACPS) to become consumers of the push service (i.e. to receive push notifications). Once registered, clients may optionally identify certain types of credentials, and/or certain users, devices, etc., for which they would like to receive push notifications.

In accordance with the principles of the present invention, the authentication credentials uses a push server to distribute push notifications containing non-privileged authentication credentials to registered client entities at predetermined intervals.

Figure 1:
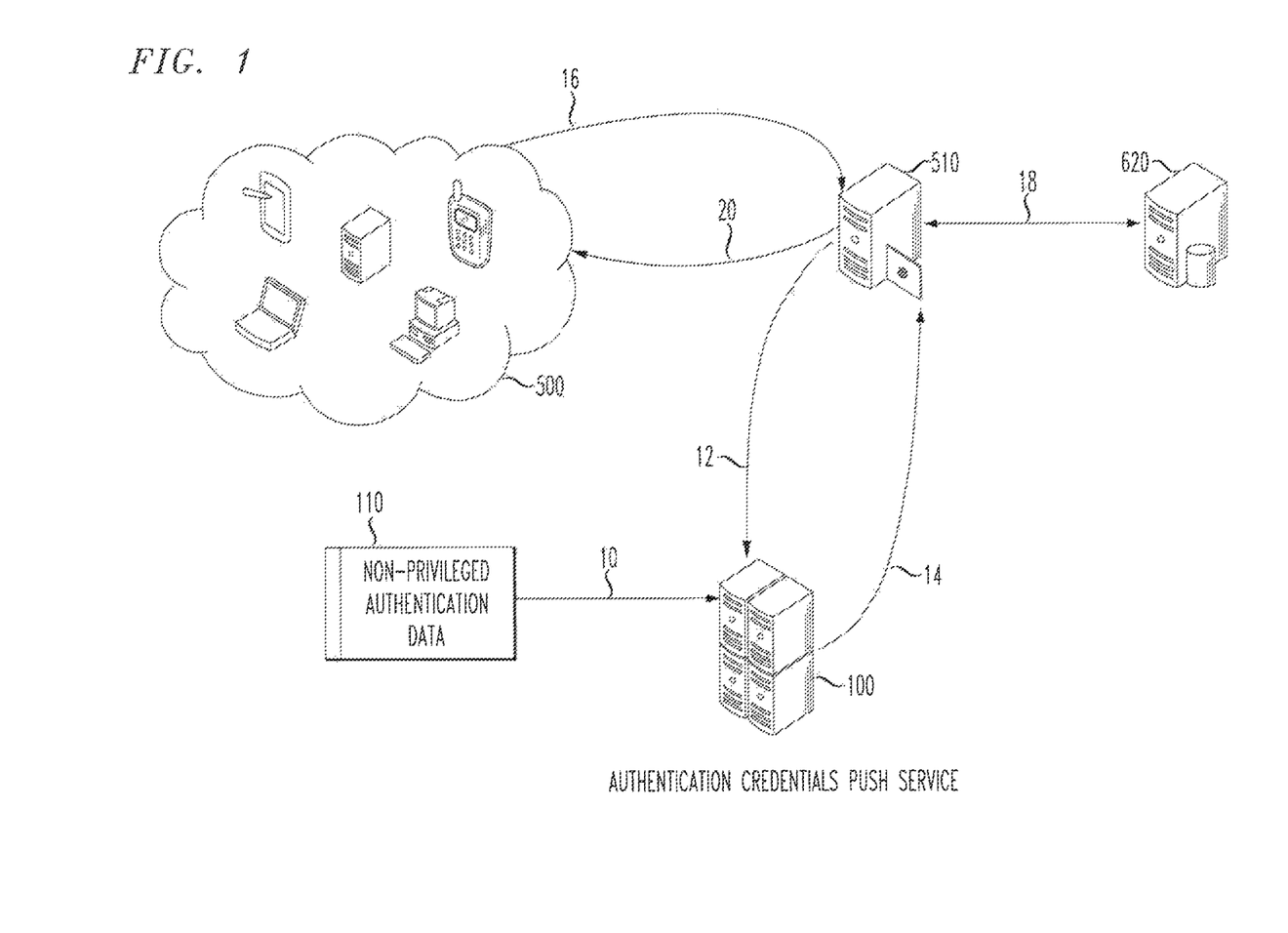
FIG. 1 depicts exemplary distribution of non-privileged authentication credentials via an authentication credentials push service (ACPS), in accordance with the principles of the present invention.

FIG. 1 depicts exemplary distribution of non-privileged authentication credentials via an authentication credentials push service (ACPS), in accordance with the principles of the present invention.

In particular, as depicted in step 10 of FIG. 1, the authentication credentials push service (ACPS) 100 acquires access to non-privileged authentication data (e.g. IP addresses, certification status, public keys, location information, etc.) 110 via an out of band means. As depicted in step 12, an authentication server 510 registers with the authentication credentials push service (ACPS) 100 to receive push notifications. As depicted in step 14, once registration is granted, the push server begins pushing non-privileged authentication credentials to the registered authentication server 510 at predetermined intervals. In step 16, a client entity (e.g. a client device, user, process, etc.) 500 sends a request for authentication to the authentication server 510. In response to the authentication request, the authentication server 510 initiates one or more queries (pull transactions) to one or more credentials servers 620, requesting privileged authentication credentials for the requesting client entity 500, as depicted in step 18. In step 20, the authentication server 510 uses privileged authentication credentials retrieved from the credentials server(s) 620, and any relevant non-privileged authentication credentials received in previous push notifications to authenticate the requesting client entity 500, e.g., client device, user, process, etc.

In accordance with the principles of the present invention, to improve performance and minimize delay during authentication transactions, authentication credentials that include only non-privileged information may be freely distributed for use by authentication servers 510.

In accordance with the principles of the present invention, the authentication credentials push service (ACPS) 100 uses a predefined application layer message format designed for transportation over secure transports, e.g., secure sockets layer (SSL)/transport layer security (TLS), internet protocol security (IPSec), etc. An inventive authentication credentials push service protocol (ACPP) makes use of simple object access protocol (SOAP) with attachments, and uses hypertext transfer protocol (secure) (http(s)) as a transport protocol.

The present invention does not define a credentials attribute tag for the authentication credentials push service (ACPS) protocol (ACPP). Instead, credentials tags are defined per installation to allow flexibility for non-privileged credentials used in each authentication context.

In accordance with the principles of the present invention, the authentication credentials push service (ACPS) 100 supports authentication credential pushes, authentication credential pulls, requests for registration, and other queries/requests as they are deemed necessary. The authentication credentials push service (ACPS) 100 additionally supports transmission of text and binary data (base 64 encoded).

In accordance with the principles of the present invention, the following requests are supported by the authentication credentials push service (ACPS) 100: registration requests (i.e. RegistrationReq), deregistration requests (i.e. DeregistrationReq), non-privileged user credentials requests (i.e. UserCredentialsReq), and poll user credentials requests (i.e. PollUserCredentialsReq).

Figure 2:
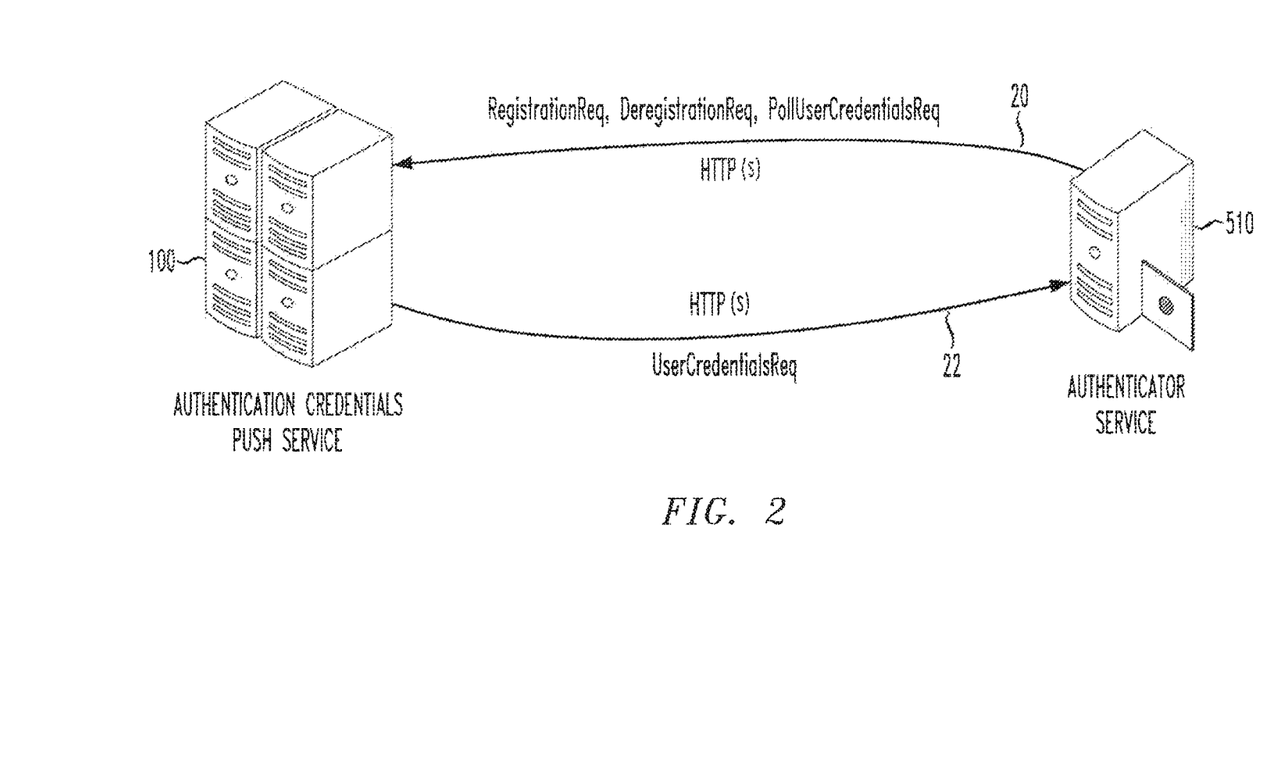
FIG. 2 depicts exemplary inbound and outbound messages exchanged for the authentication credentials push service (ACPS), in accordance with the principles of the present invention.

FIG. 2 depicts exemplary inbound and outbound messages exchanged for the authentication credentials push service (ACPS), in accordance with the principles of the present invention.

As depicted in step 20 of FIG. 2, registration requests, deregistration requests, and poll user credentials requests are all inbound messages transmitted from authentication servers 510 to the inventive authentication credentials push service (ACPS) 100. Alternatively, as depicted in step 22, user credentials requests are outbound messages transmitted from the authentication credentials push service (ACPS) 100 to authentication servers 510.

In accordance with the principles of the present invention, to request registration to the inventive push service, an authentication server 510 initiates a registration request message to the authentication credentials push service (ACPS) 100. A registration request message preferably includes the following required elements: transaction ID, registrationReq, VASPID, VASID, timestamp, realm, and one or more user ID elements.

In particular, a transaction ID element is preferably included in the SOAP header of a registration request message. The transaction ID element holds a unique identifier for the registration request message and preferably holds up to 40 characters or more. Moreover, a registrationReq element in a registration request message identifies the message as a registration request. The registration request element is preferably defined as the root element of the SOAP body.

A VASPID element in a registration request message contains a user ID for a requesting authentication server 510. Similarly, the VASID element in a registration request message holds a password for a requesting authentication server 510.

The timestamp element in the registration request message holds the time that the registration request message was sent to the authentication credentials push service (ACPS) 100. Moreover, the one or more user ID elements included in a registration request message correspond to user IDs (e.g. cell phone numbers, etc.) supported by the requesting authentication server 510.

Finally, a realm element in a registration request message holds realm(s) or domain(s) that may be used to identify a block of authentication credentials. In accordance with the principles of the present invention, each registration request message must contain one or more realm elements or one or more user ID elements. A registration request message may include both realm and user ID elements, however only one of the two types of elements (realm and user ID) is required.

A registration request message may also include attributes to explicitly identify certain types of authentication credentials a requesting authentication server 510 wishes to receive in push notifications.

In accordance with the principles of the present invention, the authentication credentials push service (ACPS) 100 returns a registration response message in response to a registration request message received from an authentication server 510. A registration response message preferably includes the following elements: transactionID, registrationResponse, statusCode, statusText, and details.

In accordance with the principles of the present invention, a transaction ID element in a registration response message is identical to a transaction ID element in a corresponding registration request message. A transaction ID element is preferably included in the SOAP header of the registration response message and may hold up to 40 characters.

Moreover, a registrationRsp element in a registration response message indicates that the message is a registration response. The registrationRsp element is preferably defined as the root element of the SOAP body.

A statusCode element in a registration response message holds a registration status code, e.g., passed, failed, etc., relevant to a corresponding registration request. Similarly, the statusText element in the registration response message holds status text relevant to a corresponding registration request. Likewise, the details element holds details regarding the status of a corresponding registration request. In accordance with the principles of the present invention, a details element conditionally populates a registration response message.

A registration request message may additionally include any other miscellaneous data regarding a corresponding request for registration.

In accordance with the principles of the present invention, a deregistration request message is a message sent from an authentication server 510 to the authentication credentials push service (ACPS) 100, to request termination of service registration. A deregistration request message preferably includes the following required (i.e. required in an outbound message) elements: transaction ID, deregistrationReq, VASPID, VASID, and timestamp.

In accordance with the principles of the present invention, a transaction ID element is preferably included in the SOAP header of a deregistration request message. The transaction ID element holds a unique identifier for the deregistration request message and preferably holds up to 40 characters.

Moreover, a deregistrationReq element in a deregistration request message identifies the message as a deregistration request. The deregistrationReq element is preferably defined as the root element of the SOAP body.

A VASPID element in a deregistration request message holds a user ID for a requesting authentication server 510. Similarly, a VASID element in a deregistration request message holds a password for a requesting authentication server 510. The timestamp element in a deregistration request message holds the time that the deregistration request message was sent to the authentication credentials push service (ACPS) 100.

Other miscellaneous data regarding a request for deregistration may also be included in a deregistration request message.

In accordance with the principles of the present invention, the authentication credentials push service (ACPS) 100 returns a deregistration response message to an authentication server 510 in response to a deregistration request previously received therefrom. In accordance with the principles of the present invention, the following elements are preferably included (but are not required) in a deregistration response message: transactionID, deregistrationRsp, statusCode, statusText, and details.

In particular, a transaction ID element is preferably included in the SOAP header of a deregistration response message. In accordance with the principles of the present invention, a transaction ID element in a deregistration response message is identical to a transaction ID element in a corresponding deregistration request message. A transaction ID element preferably holds up to 40 characters.

Moreover, a deregistrationRsp element in a deregistration response message indicates that the message is a deregistration response. The deregistration response element is preferably defined as the root element of the SOAP body.

Moreover, a statusCode element in a deregistration response message holds a status code, e.g., passed, failed, etc., relevant to a corresponding deregistration request. Similarly, the statusText element in the deregistration response message holds status text relevant to the corresponding deregistration request. Likewise, the details element holds details regarding the status of the corresponding deregistration request. In accordance with the principles of the present invention, a details element conditionally populates a deregistration response message.

Other miscellaneous data regarding a request for deregistration may also be included in a deregistration response message.

In accordance with the principles of the present invention, the inventive authentication credentials push service (ACPS) 100 supports complete updates (i.e. updates that include all data, changed and unchanged) and delta updates (i.e. updates that include only data that has changed).

Moreover, the inventive authentication credentials push service (ACPS) 100 supports periodic and immediate credential push modes. In a periodic credential push mode, the authentication credentials push service (ACPS) 100 sends periodic credential updates to relevant authentication servers 510, based on a total number of updates and/or time intervals. Alternatively, in immediate credential push mode, the authentication credentials push service (ACPS) 100 pushes updated credentials to relevant authentication servers 510 as soon as updates are acquired.

In accordance with the principles of the present invention, a push server pushes user credentials request messages containing non-privileged authentication credentials to registered authentication servers 510 at predetermined intervals. A user credentials request message preferably comprises the following elements: transaction ID, message integrity code (an optional message element), userCredentialsReq, VASPID, VASID, timestamp, allCredentials, validityPeriod, one or more userID elements, one or more credentials elements, and one or more validityPeriod elements.

In accordance with the principles of the present invention, a transaction ID element is preferably included in the SOAP header of a user credentials request message. The transaction ID element holds a unique identifier for the user credentials request message and preferably holds up to 40 characters. Moreover, a message integrity code element in a user credentials request message contains a hash algorithm value of message contents and a pre-shared key. Contents of a pre-shared key are decided based upon configuration.

In accordance with the principles of the present invention, a userCredentialsReq element in a user credentials request message identifies the message as a user credentials request. The userCredentialsReq element is preferably defined as the root element of the SOAP body.

A VASPID element in a user credentials request message holds a user ID for the originating entity. Similarly, a VASID element in a user credentials request message holds a password for the originating entity. The timestamp element in a user credentials request message holds the time that the user credentials request message was sent to an authentication server 510.

Moreover, a userID element in a user credentials request message contains a unique identifier (e.g., a cell phone number) for a client entity for which authentication credentials are being transmitted. One or more userIDs may be included in a user credentials request message. Further, a user credentials request message includes one or more credentials elements for each userID element included therein.

In accordance with the principles of the present invention, the authentication credentials push service (ACPS) 100 may use the same request to pass credentials, regardless of whether a full list or an updated (only) list of credentials is currently available.

In particular, an allCredentials element in a user credentials request message may contain a value of 'true' or 'false' (i.e. the allCredentials element is a Boolean element). In accordance with the principles of the present invention, if the value of an allCredentials element is 'false', then the user credentials request message contains only updated credentials. Alternatively, if the value of an allCredentials element is 'true', then the user credentials request message contains a full list of credentials (i.e. updated and non-updated) for each userID element included therein.

Moreover, a validityPeriod element in a user credentials request message holds a timestamp indicating when a particular authentication credential was created. The authentication credentials request message includes a validityPeriod element for each authentication credential, per user and/or per attribute level, included therein. An authentication server 510 uses a validityPeriod element to determine the validity of pushed credentials.

In accordance with the principles of the present invention, an authentication server 510 returns a user credentials response message in response to a user credentials request message received from the authentication credentials push service (ACPS) 100. A user credentials response message preferably contains the following elements: transactionID, userCredentialsRsp, statusCode, statusText, and details.

In particular, a transaction ID element is preferably included in the SOAP header of a user credentials response message. In accordance with the principles of the present invention, a transaction ID element in a user credentials response message is identical to a transaction ID element in a corresponding user credentials request message. A transaction ID element preferably holds up to 40 characters or more.

Moreover, a userCredentialsRsp element in a user credentials response message indicates that the message is a user credentials response message. The userCredentialsRsp element is preferably defined as the root element of the SOAP body.

Moreover, a statusCode element in a user credentials response message holds a status code, e.g., passed, failed, etc., relevant to a corresponding user credentials request. Similarly, the statusText element in the user credentials response message holds status text relevant to the corresponding user credentials request. Likewise, the details element holds details regarding the status of the corresponding user credentials request. In accordance with the principles of the present invention, a details element conditionally populates a user credentials response message.

A user credentials response message may also include any other miscellaneous data regarding a corresponding user credentials request.

In accordance with the principles of the present invention, a registered authentication server 510 may send a poll user credentials request message to the authentication credentials push service (ACPS) 100 to request updated authentication credentials. A poll user credentials request message preferably comprises the following required elements: transaction ID, pollUserCredentialsReq, VASPID, VASID, Timestamp, Realm, allCredentials, ValidityPeriod, and one or more userIDs.

In accordance with the principles of the present invention, a transaction ID element is preferably included in the SOAP header of a poll user credentials request message. The transaction ID element holds a unique identifier for the poll user credentials request message and preferably holds up to 40 characters.

Moreover, a pollUserCredentialsReq in a poll user credentials request message identifies the message as a poll user credentials request. The pollUserCredentialsReq element is preferably defined as the root element of the SOAP body.

A VASPID element in a poll user credentials request message holds a user ID for a requesting authentication server 510. Similarly, a VASID element in a poll user credentials request message holds a password for the requesting authentication server 100. Moreover, a timestamp element in a poll user credentials request message holds the time that the poll user credentials request message was sent to the authentication credentials push service (ACPS) 100.

In accordance with the principles of the present invention, a poll user credentials request message includes one or more userID elements corresponding to user IDs (e.g. cell phone numbers, etc.) supported by the requesting authentication server 510.

A realm element in a poll user credentials request message holds realm(s) or domain(s) that may be used to identify a block of authentication credentials. In accordance with the principles of the present invention, each poll user credentials request message must contain one or more realm elements or one or more user ID elements. A poll user credentials request message may include both realm and user ID elements, however only one of the two types of elements (realm and user ID) is required.

A poll user credentials request message may also include attributes to explicitly identify certain types of authentication credentials that an authentication server wishes to receive in push notifications.

In accordance with the principles of the present invention, an allCredentials element in a poll user credentials request message may contain a true or false value (i.e. the allCredentials element is a Boolean element). In particular, when the value of an allCredentials element is 'false' in a poll user credentials request message, an authentication server 510 is requesting that only updated credentials be returned in a poll user credentials response message. Alternatively, when the value of an allCredentials element in a poll user credentials request message is 'true', an authentication server 510 is requesting that that a full list of credentials (updated and not updated) for indicated userIDs be returned in a poll user credentials response message.

Moreover, a validityPeriod element in a poll user credentials request message holds a timestamp. This validityPeriod element is used to request that the authentication credentials push service (ACPS) 100 return all credentials matching realm and/or userID values specified in the poll user credentials request message, that have been updated following the value in this validityPeriod (timestamp) element.

In accordance with the principles of the present invention, a poll user credentials response message is sent from the authentication credentials push service (ACPS) 100 to an authentication server 510 in response to a user credentials request message previously received therefrom. A poll user credentials response message preferably contains the following elements: transactionID, messageIntegrityCode, pollUserCredentialsRsp, VASPID, VASID, Timestamp, UserID, AllCredentials, Credentials, and ValidityPeriod.

In accordance with the principles of the present invention, a transaction ID element in a poll user credentials response message is identical to a transaction ID element in a corresponding poll user credentials request message. A transaction ID element is preferably included in the SOAP header of the poll user credentials response message and may hold up to 40 characters or more.

A message integrity code element in a poll user credentials response message contains a hash algorithm value of message contents and a pre-shared key. Contents of a pre-shared key are decided based upon configuration.

Moreover, a pollUserCredentialsRsp element is included in a poll user credentials response message to identify the message as a poll user credentials response. The pollUserCredentialsRsp element is preferably defined as the root element of the SOAP body.

The VASPID element in a poll user credentials response message holds a user ID for the originating entity. Similarly, the VASID element in a poll user credentials response message holds a password for the originating entity.

The timestamp element in a poll user credentials response message holds the time the poll user credentials response message is sent from the authentication credentials push service (ACPS) 100 to an authentication server 510.

Moreover, a userID element in a poll user credentials response message holds a unique identifier, e.g., a cell phone number, for a client entity for which authentication credentials are being transmitted. One or more userIDs may be included in a poll user credentials response message. Further, one or more credentials elements may be included in a poll user credentials response message for each userID indicated therein.

In accordance with the principles of the present invention, an allCredentials element in a poll user credentials response message contains a true or false value (i.e. the allCredentials element is a Boolean element). If the value of the allCredentials element is 'false', then only updates made to credentials are included in the poll user credentials response message. Alternatively, if the value of the allCredentials element is 'true', then the poll user credentials response message contains a full list of credentials (updated and non-updated) for each userID indicated therein.

Moreover, a validityPeriod element in a poll user credentials response message holds a timestamp that indicates when a particular authentication credential was created. A validity element is included in the poll user credentials response message for each authentication credential, per user and/or per attribute level, indicated therein.

In accordance with the principles of the present invention, each authentication credentials push service (ACPS) 100 gains access to non-privileged authentication credentials via an out of band means. Consequently, individual authentication credentials push services (ACPS) 100 may have access to different authentication credentials. In accordance with the principles of the present invention, authentication servers 510 may use a domain name system (DNS) service to lookup a specific authentication credentials push service (ACPS) 100 based on specific authentication requirements.

In accordance with the principles of the present invention, an authentication credentials push service (ACPS) 100 registers with a designated domain name system (DNS) service via standard dynamic DNS update (secure/non-secure) mechanisms. For instance, an authentication credentials push service (ACPS) 100 may register itself with one identifier for the authentication credentials push service (ACPS) 100, and may simultaneously maintain additional DNS registrations for typical network access and routing functions. By registering with a designated DNS service, an authentication credentials push service (ACPS) 100 identifies itself as being 'available'. An authentication server 510 may then implement a DNS lookup to gain information necessary to connect with a particular authentication credentials push service (ACPS) 100.

Figure 3:
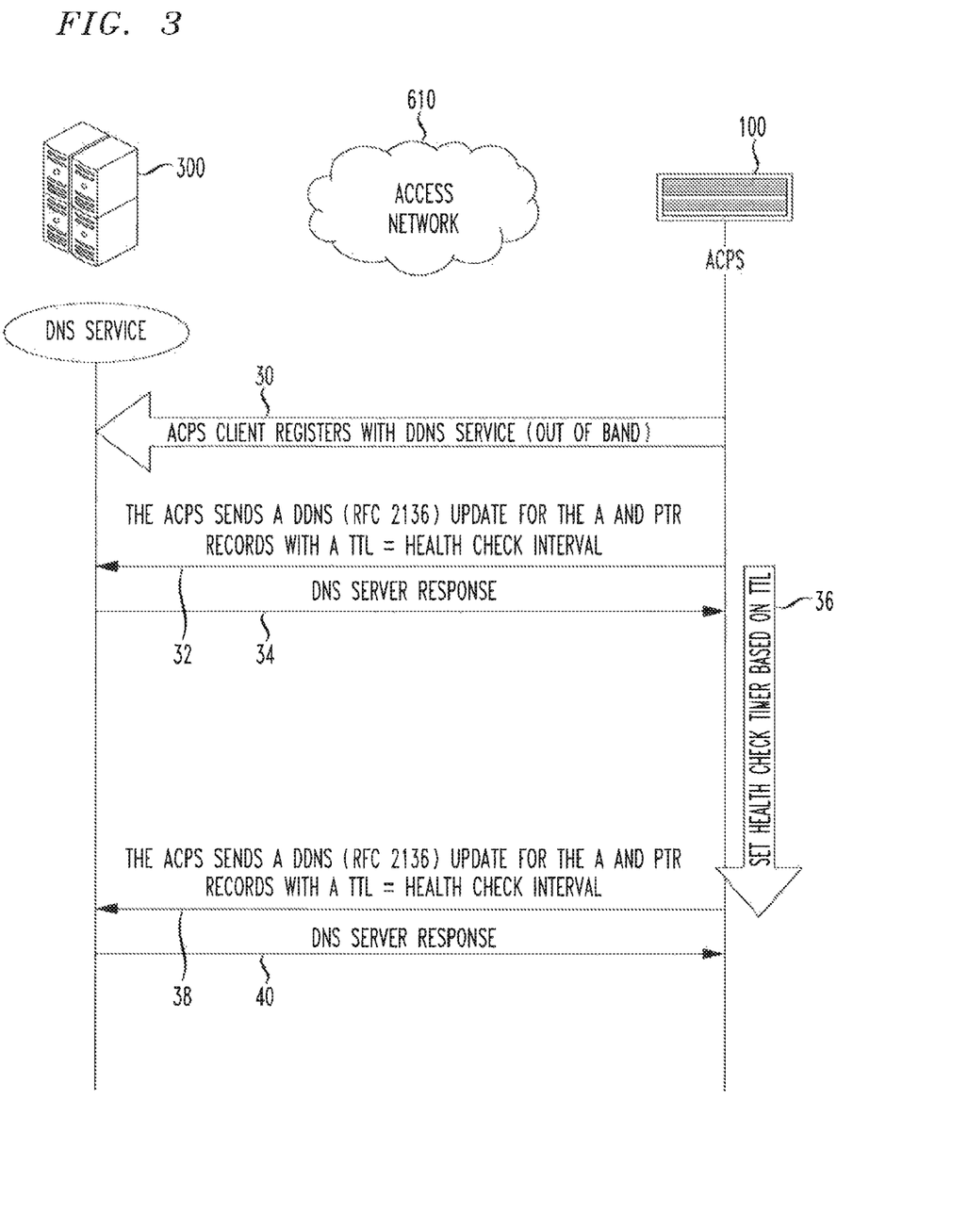
FIG. 3 depicts exemplary communication between an authentication credentials push service and a dynamic DNS service, in accordance with the principles of the present invention.

FIG. 3 depicts exemplary communication between an authentication credentials push service and a dynamic DNS service, in accordance with the principles of the present invention.

In particular, as depicted in step 30 of FIG. 3, an authentication credentials push service (ACPS) 100 registers with a dynamic DNS service 300 (out of band). As portrayed in step 32, the authentication credentials push service (ACPS) 100 then sends a dynamic DNS (rfc 2136) update for address (A) and pointer (DNS) record type (PTR) records to the DNS server 300, and sets a time to live parameter (i.e. a health check interval). In step 34, the DNS server 300 sends a response to the authentication credentials push server (ACPS) 100 to acknowledge receipt of the update.

As depicted in step 36, the authentication credentials push service 100 then initiates a health check timer, based on the time to live parameter (TTL) sent to the DNS server 300 (in step 32). In accordance with the principles of the present invention, if the authentication credentials push service (ACPS) 100 fails before the health check timer (i.e. time to live parameter) has expired, then the DNS record expires and the DNS server 300 no longer forwards to the authentication credentials push service (ACPS) 100. Alternatively, as depicted in step 38, if the authentication credentials push service (ACPS) 100 does not fail before the health check timer (i.e. time to live parameter) has expired, then the authentication credentials push service (ACPS) 100 sends another update for address (A) and pointer (DNS) record type (PTR) records to the DNS server 300, along with a new time to live (TTL) parameter. In step 40, the DNS server 300 sends a response to the authentication credentials push server (ACPS) 100 to acknowledge receipt of the update.

If an authentication credentials push service (ACPS) 100 abnormally terminates (e.g. unexpectedly goes offline or can't complete a periodic update process for some reason), then the dynamic DNS record expires when the time to live (TTL) value expires.

For a graceful shutdown, the authentication credentials push service (ACPS) 100 sends out an additional update message to remove entries from the DDNS server 300.

Figure 4:
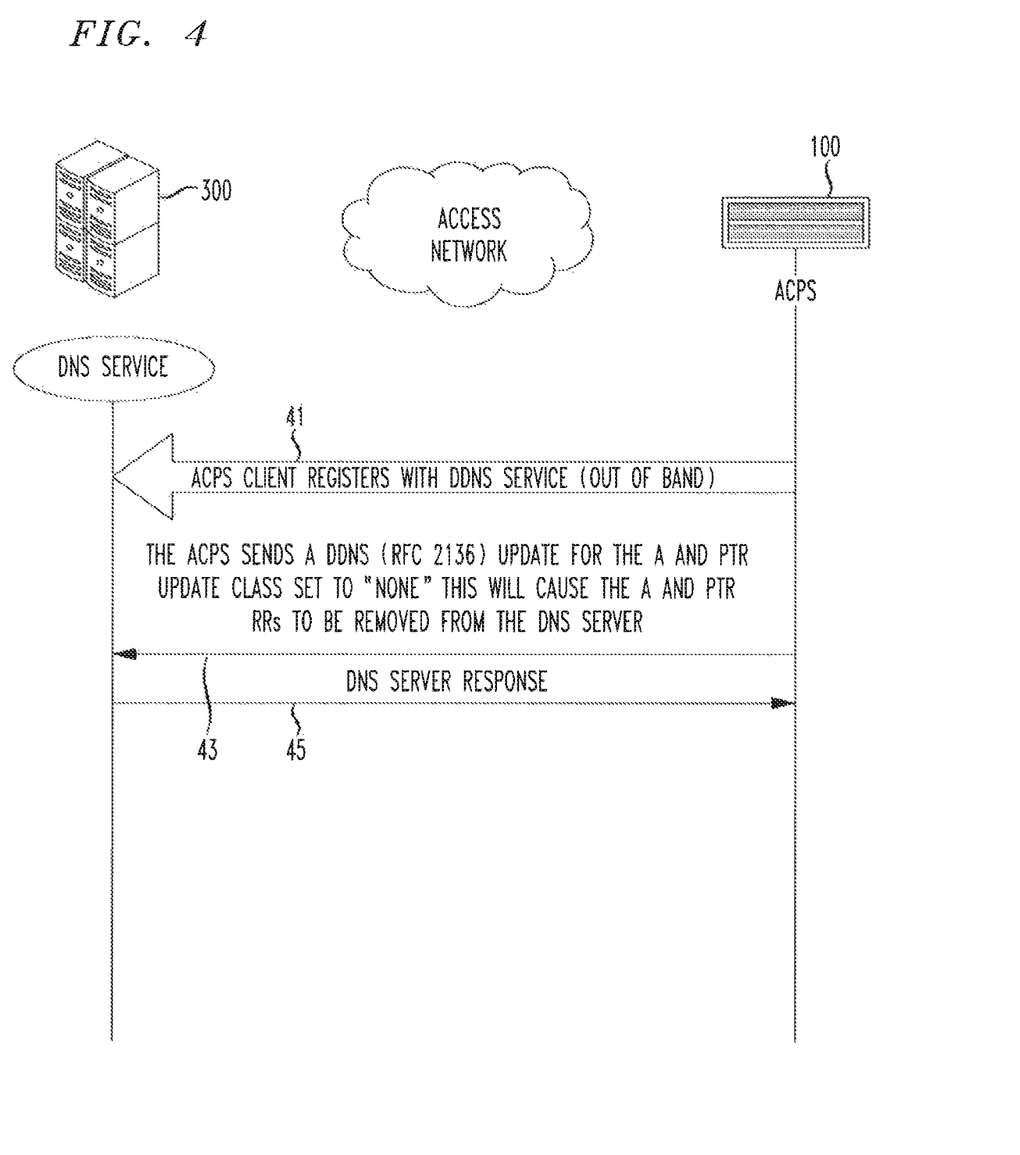
FIG. 4 shows an exemplary dynamic DNS registration removal of entry, in accordance with the principles of the present invention.

FIG. 4 shows an exemplary dynamic DNS registration removal of entry, in accordance with the principles of the present invention.

In particular, as depicted in step 41 of FIG. 4, an authentication credentials push service (ACPS) 100 registers with a dynamic DNS service 300 (out of band). As portrayed in step 43, the authentication credentials push service (ACPS) 100 then sends a dynamic DNS (rfc 2136) update for the address (A) and pointer (DNS) record type (PTR) update class, set to 'NONE', to the DNS server 300. This update causes the address (A) and pointer (DNS) record type (PTR) resource records to be removed from the DNS server 300. In step 45, the DNS server 300 sends a response to the authentication credentials push server (ACPS) 100 to acknowledge receipt of the update.

An authentication credentials push service (ACPS) 100 performs the call flow depicted in FIG. 4 to remove itself from a pool of servers, when performing a graceful shutdown.

The invention has particular applicability to the arena of authentication, including web applications with authentication, whether it be consumers of authentication or the servers responsible for authentication, e.g., AAA, RADIUS, Diameter, HSS, VPN, etc.

While the invention has been described with reference to the exemplary embodiments thereof, those skilled in the art will be able to make various modifications to the described embodiments of the invention without departing from the true spirit and scope of the invention.

What is claimed is:

1. A method of receiving authenticating credentials without requiring a pull transaction, comprising:
   requesting, from a physical credentials database of authentication credentials, by a physical authentication credentials push server, said authentication credentials including privileged authentication credentials and non-privileged authentication credentials;
   registering, in a physical registration database, a plurality of non-requesting physical authentication servers registered for receipt of a non-requested push of non-privileged authentication credential data from said physical authentication credentials push server, said push being performed absent a pull transaction by at least one non-requesting physical authentication server receiving said non-privileged authentication credentials;
   distinguishing, by said physical authentication credentials push server, between privileged and non-privileged authentication credentials within said physical credentials database; and
   pushing at predetermined intervals, from said physical authentication credentials push server, said non-privileged authentication credentials to said at least one non-requesting physical authentication server.

2. The method of receiving authenticating credentials without requiring a pull transaction according to claim 1, wherein said privileged authentication credentials comprise:
   private, forgeable information.

3. The method of receiving authenticating credentials without requiring a pull transaction according to claim 1, wherein said non-privileged authentication credentials comprise:
   non-sensitive, non-forgeable information.

4. The method of receiving authenticating credentials according to claim 1, further comprising:
   restricting access to said privileged authentication credentials.

5. The method of receiving authenticating credentials according to claim 1, further comprising:
   registering said physical authentication credentials push server with a domain name service (DNS) system.

6. The method of receiving authenticating credentials according to claim 1, further comprising:
   communicating via a domain name service (DNS) lookup to acquire information sufficient to connect with said physical authentication credentials push server.

* * * * *